(12) United States Patent
Tabatabaee et al.

(10) Patent No.: US 7,525,978 B1
(45) Date of Patent: Apr. 28, 2009

(54) METHOD AND APPARATUS FOR SCHEDULING IN A PACKET BUFFERING NETWORK

(75) Inventors: Vahid Tabatabaee, Gaithersburg, MD (US); Son Truong Ngo, Frederick, MD (US)

(73) Assignee: Altera Corporation, San Jose, CA (US)

( * ) Notice: Subject to any disclaimer, the term of this patent is extended or adjusted under 35 U.S.C. 154(b) by 559 days.

(21) Appl. No.: 11/106,661

(22) Filed: Apr. 15, 2005

(51) Int. Cl.
*H04L 12/28* (2006.01)
*H04L 12/56* (2006.01)

(52) U.S. Cl. ............... 370/411; 370/414; 370/416

(58) Field of Classification Search ............ 370/411, 370/414, 230, 395, 389, 229, 386, 462, 419, 370/392, 447, 412
See application file for complete search history.

(56) References Cited

U.S. PATENT DOCUMENTS

| | | | |
|---|---|---|---|
| 5,754,791 A | 5/1998 | Dahlgren et al. | |
| 5,923,644 A * | 7/1999 | McKeown et al. | 370/230 |
| 6,134,217 A | 10/2000 | Stiliadis et al. | |
| 6,157,654 A | 12/2000 | Davis | |
| 6,185,221 B1 | 2/2001 | Aybay | |
| 6,247,058 B1 | 6/2001 | Miller et al. | |
| 6,262,986 B1 | 7/2001 | Oba et al. | |
| 6,341,309 B1 | 1/2002 | Vaid et al. | |
| 6,757,246 B2 * | 6/2004 | Alasti et al. | 370/230 |
| 6,990,072 B2 * | 1/2006 | Alasti et al. | 370/230 |
| 7,170,903 B2 * | 1/2007 | Alasti et al. | 370/414 |
| 2001/0043612 A1 * | 11/2001 | Johnson et al. | 370/462 |
| 2003/0035427 A1 * | 2/2003 | Alasti et al. | 370/395.4 |
| 2003/0072312 A1 * | 4/2003 | Alasti et al. | 370/395.4 |

* cited by examiner

*Primary Examiner*—Edan Orgad
*Assistant Examiner*—Prenell P Jones
(74) *Attorney, Agent, or Firm*—Martine Penilla & Gencarella, LLP

(57) ABSTRACT

A system and method that can be deployed to schedule links in a switch fabric. The operation uses two functional elements: to perform updating of a priority link list; and then selecting a link using that list.

14 Claims, 16 Drawing Sheets

| Link # | Credit Value |
|---|---|
| 1 | 1 |
| 2 | 10 |
| 3 | 6 |
| 4 | 15 |
| 5 | 3 |
| 6 | 8 |
| 7 | 6 |
| 8 | 5 |

Fig. 7A

| Priority | Link # |
|---|---|
| 1 | 4 |
| 2 | 2 |
| 3 | 6 |
| 4 | 3 |
| 5 | 7 |
| 6 | 8 |
| 7 | 5 |
| 8 | 1 |

Fig. 7B

| Link # | Request Status |
|---|---|
| 1 | N |
| 2 | Y |
| 3 | N |
| 4 | N |
| 5 | N |
| 6 | Y |
| 7 | Y |
| 8 | N |

Fig. 8A

| Links Sorted by Priority | Request Status |
|---|---|
| 4 | N ← |
| 2 | (Y) |
| 6 | Y |
| 3 | N |
| 7 | Y |
| 8 | N |
| 5 | N |
| 1 | N |

Fig. 8B

| Credit Value | Link # |
|---|---|
| 15 | 4 (p) |
| 10 | 2 (A) |
| 8 | 6 (y) |
| 6 | 3 |
| 6 | 7 (y) |
| 5 | 8 |
| 3 | 5 |
| 1 | 1 |

Fig. 9A

| Updated Credit Value | Link # |
|---|---|
| 14 | 4 |
| 9 | 2 |
| 8 | 6 |
| 6 | 3 |
| 6 | 7 |
| 5 | 8 |
| 3 | 5 |
| 1 | 1 |

Fig. 9B

| Updated Credit Value | Link # |
|---|---|
| 14 | 4 |
| 9 | 2 |
| 9 | 6 |
| 6 | 3 |
| 6 | 7 |
| 5 | 8 |
| 3 | 5 |
| 1 | 1 |

Fig. 9C

| Credit Value | Link # (Request Status) |
|---|---|
| 9 | 8 (N) |
| 7 | 6 (Y) |
| 7 | 4 (N) |
| 7 | 2 (N) |
| 5 | 7 (Y) |
| 3 | 5 (Y) |
| 3 | 3 (N) |
| 3 | 1 (N) |

Fig. 10A

| Updated Credit Value | Link # |
|---|---|
| 8 | 8 |
| 7 | 6 |
| 7 | 4 |
| 7 | 2 |
| 5 | 7 |
| 3 | 5 |
| 3 | 3 |
| 3 | 1 |

Fig. 10B

| Updated Credit Value | Link # |
|---|---|
| 8 | 8 |
| 7 | 6 |
| 7 | 4 |
| 7 | 2 |
| 5 | 7 |
| 4 | 1 |
| 3 | 3 |
| 3 | 5 |

Fig. 10C

| Updated Credit Value | Link # |
|---|---|
| 8 | 8 |
| 7 | 2 |
| 7 | 4 |
| 6 | 6 |
| 5 | 7 |
| 4 | 1 |
| 3 | 3 |
| 3 | 5 |

Fig. 10D

| Link # | Credit | EQ Flag |
|---|---|---|
| 8 | 9 | 0 |
| 6 | 7 | 1 |
| 4 | 7 | 1 |
| 2 | 7 | 0 |
| 7 | 5 | 0 |
| 5 | 3 | 1 |
| 3 | 3 | 1 |
| 1 | 3 | x |

Fig. 11

| Link # | Credit | △ |
|---|---|---|
| 8 | 9 | 2 |
| 6 | 7 | 0 |
| 4 | 7 | 0 |
| 2 | 7 | 2 |
| 7 | 5 | 2 |
| 5 | 3 | 0 |
| 3 | 3 | 0 |
| 1 | 3 | x |

Fig. 12

METHOD AND APPARATUS FOR SCHEDULING IN A PACKET BUFFERING NETWORK

CROSS-REFERENCE TO RELATED APPLICATIONS

The present invention is related to the following applications:

U.S. application Ser. No. 10/928,533 entitled "Method And Apparatus for Weighted Arbitration Scheduling Separately At The Input Ports And Output Ports Of A Switch Fabric," filed Aug. 14, 2001 and issued as U.S. Pat. No. 6,757,246; U.S. application Ser. No. 10/928,509 entitled "Method And Apparatus For Parallel, Weighted Arbitration Scheduling For A Switch Fabric," filed Aug. 14, 2001 and published as 20030072326 on Apr. 17, 2003; U.S. application Ser. No. 10/928,747 entitled "Method And Apparatus For Arbitration Scheduling With A Penalty For A Switch Fabric" filed on Aug. 14, 2001 and published as 20030035427 on Apr. 17, 2003; and U.S. application Ser. No. 10/952,099 entitled "Method And Apparatus For Priority-Provisional Arbitration Scheduling For A Switch Fabric" filed on Sep. 29, 2004. The entirety of the disclosures of these four patent applications are hereby incorporated by reference into the present application.

BACKGROUND

The present invention relates generally to scheduling in a packet buffering network. More specifically, the present invention is directed to a method and apparatus for scheduling flows of packets in a credit-based scheduling system, using an approach that divides the task into two main functions: sorting; and scheduling. The two main functions are then assigned to separate but related operational blocks. By dividing the operation into these functions and operational blocks, the scheduling operation can be enhanced.

Digital packet networks transport bundles or packets of digital information from an origin to a destination over a suitable data transmission medium. Typically, such networks incorporate routing hardware and/or software to direct the packets through the network. Such routing operations often rely upon telecommunication switches which receive input data along multiple ports and then transfer this data out along multiple output ports using what is commonly referred to as a switch fabric.

Known switch fabrics with crossbar architectures exist where data cells received on the multiple input ports of the switch are sent to the various output ports of the switch. Scheduling techniques ensure that the data cells received from different input ports are not sent to the same output port at the same time. These techniques determine the temporary connections between input ports and output ports, via the switch fabric, for a given time slot.

Scheduling techniques can be evaluated based on a number of performance requirements to a broad range of applications. Such performance requirements can include, for example, operating at a high speed, providing a high throughput (i.e., scheduling the routing of as many data cells as possible for each time slot), guaranteeing quality of service (QoS) for specific users, and being easily implemented in hardware. Known scheduling techniques trade one or more performance areas for other performance areas.

Scheduling systems have been created around the concept of buffering input data at respective input port queues and then assigning an input port queue to an output port queue based on credits assigned to or accumulated by data packets, where the credits may be assigned according to certain rules relating to latency within an input queue.

All four of the U.S. patent applications incorporated herein by reference above describe different techniques available for assigning credits or creating switching priorities for data packets in a given switching fabric. The entirety of the disclosures of these patent applications are hereby incorporated by reference.

FIG. 1 illustrates a system block diagram of a switch, according to an embodiment of the present invention. Switch fabric 100 includes crossbar switch 110, input ports 120, output ports 130 and scheduler 140. Crossbar switch 110 is connected to input ports 120 and output ports 130. Scheduler 140 is coupled to crossbar switch 110, input ports 120 and output ports 130.

As shown for the top-most input ports 120 of FIG. 1, each input port 120 has a set of queues 121 into which packets received at the input port are buffered. More specifically, each queue in the set of queues 121 is a virtual output queue (VOQ) uniquely associated with a specific output port 130. Thus, received packets (each designating a particular destination output port) are buffered in the appropriate VOQ for its destination output port.

In general, as packets are received at the input ports 120, they are subsequently routed to the appropriate output port 130 by the crossbar switch 110. Of course, packets received at different input ports 120 and destined for the same output port 130 can experience contention within the crossbar switch 110. Scheduler 140 resolves such contention, as discussed below, based on an arbitration (or scheduling) process.

Scheduler 140 uses a priority assignment scheme. In one example the assignment scheme supports rate provisioning. Using the priority assignment scheme, scheduler 140 is capable of supporting quality of service (QoS) and traffic management in the network to which switch 100 is connected (not shown). In addition, scheduler 140 can provide a high throughput in the switch fabric.

Generally speaking, scheduler 140 performs three steps during the arbitration process: generating requests, generating grants and generating accepts. The patent applications described above provide details for examples of how grant and accept decisions may be affected by weighing or credit schemes that take into account the priority of a given input port to output port connection based on factors such as latency.

In other words, a given input port 120 can be associated with a set of links across crossbar switch 110, whereby the given input port 120 could possibly be connected to a set of output ports 130 (e.g., every output port 130) where a link can be considered a potential path across the crossbar switch between an input port and an output port. For a given time slot an input port will be connected to only one output port via one of these "links." Similarly, a given output port 130 is associated with a separate set of links across crossbar switch 110, whereby the given output port 130 can be connected to a set of input ports 120 (e.g., every input port 120). Scheduler 140 can be configured so that, for example, a particular link will have a higher priority than other links. In the prior applications, this is done using credit values or weights.

FIG. 2 illustrates a typical arrangement in which the scheduling mechanism includes a plurality of arbitrators. In this example, each input port is associated with a grant arbitrator 210. The grant arbitrator for a given input port receives the requests for the various input buffer queues associated with that port and then selects one based on the priority scheme in place. The grant arbitrators for the various input ports work in parallel. The result is the selection by a given grant arbitrator of a link (i.e., which output port) for the associated input port for the selected time slot. Because the arbitrators work in parallel, it is possible that two or more grant arbitrators may select the same output port as the desired destination. Thus, a second arbitration process is necessary at the output port side. This process is executed by accept arbitrators 220. In the illustrated example, there is an accept arbitrator for each output port. Each accept arbitrator receives information about those potential links to the associated output port. The accept arbitrator operates to select that one of the "granted" links for a given output port which should be "accepted". This accept arbitrator can also use a weighting or credit based scheme as described in the prior applications cited and incorporated above.

The known credit-based or token systems can be effective arrangements for controlling the flow of data packets across the switch fabric. In these schemes each flow has a dynamic credit value and the flow with the highest credit value is typically granted and accepted. The credit value can be based on a number of factors including the number of backlogged packets for that flow, a guaranteed rate for that flow deadlines associated with the packets or some combination of these or other criteria. However, these arrangements require the execution of the algorithms and logic which can be complex. The more complex the weighting or priority system, the more potential for an adverse impact on the execution of the scheduling task itself.

It would be beneficial to provide an arrangement that improves upon the execution of the scheduling task without being overly burdened by the priority or credit assignment scheme of interest.

SUMMARY OF THE INVENTION

The present invention provides a method and an apparatus for scheduling data flows in a packet data network. The present invention divides the scheduling function into two primary components. The first component is a credit or weight updating function which also includes logic for sorting the potential flows or links based on the updated information. The second component is a scheduling unit that uses the sorted updated credit or weight values to do schedule selection that could be based on maximum credit or weight information.

In one embodiment, the arbitrator maintains a list of the credit values for each potential link for the port associated with the arbitrator. The list is updated and sorted after each assignment time slot. The updating and sorting is performed by one portion of the scheduler. The sorted list is then used in another portion of the scheduler to execute link scheduling or selection.

Further details concerning the schedule arrangement and method of the present invention are set forth below.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 7A to 12 are tables useful for explaining scheduling, updating, sorting and re-sorting operations in conjunction with the scheduler of FIGS. 3 and 4.

DETAILED DESCRIPTION

The present invention addresses the potential negative impact of complex credit assignment algorithms in a schedule operation. More specifically, the present invention parses the scheduling operation into two primary functions. This is illustrated in the block diagram of FIG. 3 which show an arbitrator 300 that can perform either a grant operation or an accept operation.

In this embodiment a Priority Update Generator 310 performs two functions. The first function relates to assigning credits to each of the potential links for the port with which the arbitrator is associated, consistent with a predetermined credit allocation algorithm. The second function relates to creating a priority list of the potential links where the order of the links in the priority list reflects the credit values assigned to the respective links. For example, the priority list can list the potential links in an order from the link having the highest credit value down to the link with the lowest credit value. This priority list can be considered a sort list, that is, it is a sort of the potential links based on priorities related to assigned credit values.

While the Priority Update Generator updates link credit values and sorts the link list, a second module, the Priority Link Selector 320 uses the priority list (or sort list) to select a requested (or granted) link for a grant (or acceptance). The Priority Link Selector receives the link requests for the associated port and it receives the sort list. The Priority Link Selector grants (or accepts) that link that has a pending request (grant) and has the highest ranking among the potential links as indicated by the link order in the sort list.

Figure 5:
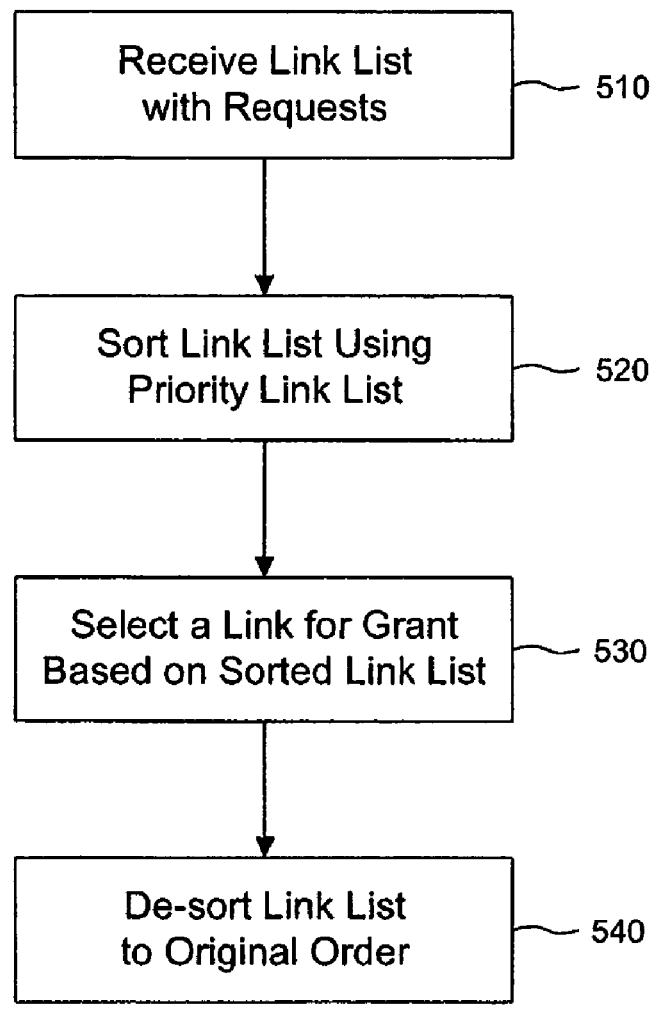
FIG. 5 is a flow diagram for a grant operation in accordance with an embodiment of the present invention.
Figure 6:
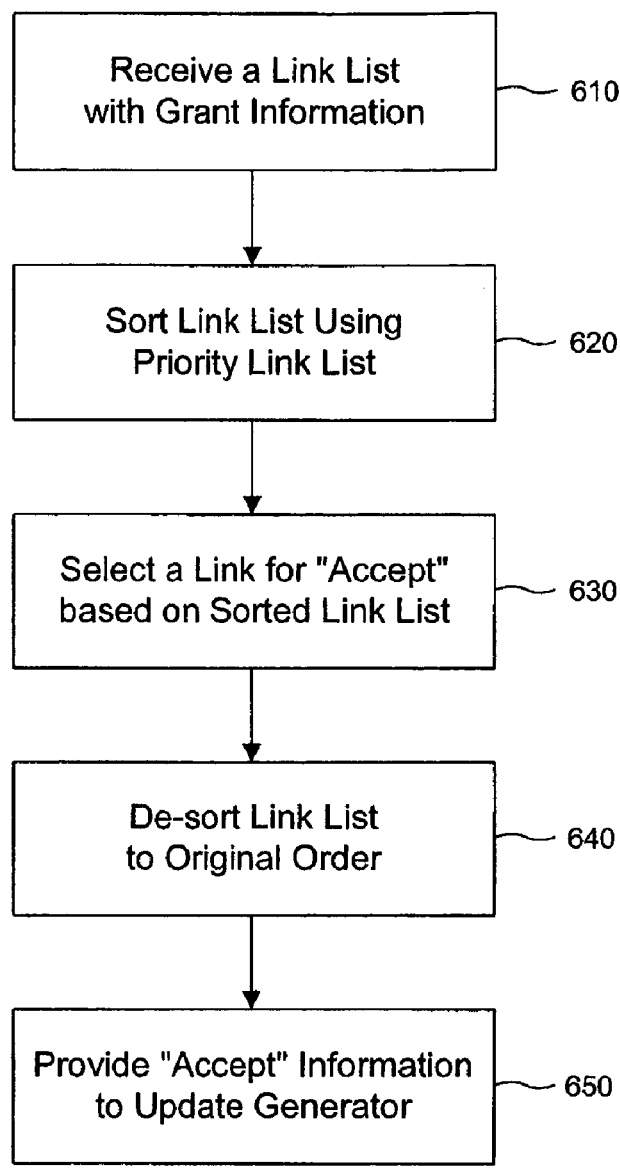
FIG. 6 is a flow diagram for an accept operation in accordance with an embodiment of the present invention.

FIGS. 5 and 6 are flow diagrams that describe how this update/selection technique can be used to select a link from one input port of a cross bar switch fabric.

The flow diagram of FIG. 5 reflects the processing of a set of link requests associated with an input port. The link list, that is the list of links for that input port is received 510. This operation is performed by the Priority Link Selector. The list denotes which, if any, of the potential links has a request associated therewith. In this instance, a request reflects the fact that there is data at the input port that is destined for an outport port associated with that link. In one embodiment this data is buffered at the input port either in an actual or a virtual queue associated with that link. At any time two or more links may have requests for sending data across the switch fabric.

The Priority Link Selector then sorts the received link list based on a priority link list created by the Priority Update Generator, 520. The Priority Link Selector then selects one of the requests for a "grant" based on the sorted link list, 530. The Priority Link Selector then de-sorts the link list back to the original order, 540.

Similar operations are performed in parallel in the arbitrators for the other input ports. As a result, if there are N input ports and N output ports, then at the end of the input port arbitrator process there can be up to N arbitrator grants. Two or more input port arbitrators may grant requests to the same output port. This granted link information is then the subject of an output port arbitration process, a potential flow for which is illustrated in FIG. 6.

The output port arbitrator receives a list of the potential links where the list is associated with grant information, that is, some indication for each link to whether a request for that link has been received and granted by an input arbitrator, 610. Once the output arbitrator's Priority Link Selector receives the link list with grant information it reorders it or sorts it using a priority link list supplied by the output arbitrator's Priority Update Generator, 620. The Priority Link Selector then selects one of the granted links to be "accepted" based on the sorted link list, 630. The link list is de-sorted to its original order while still capturing the "accept" information, 640. The Priority Link Selector then supplies the "accept" information, that is, information about the link selected for acceptance, to the Priority Update Generator, 650. The output Priority Update Generator takes the accept information and then updates the credit information for that arbitrator's set of links. The update operation can include a process that updates the order of the priority link list to reflect the credit updates, where the re-ordering is done concurrently with the credit updating.

The acceptance information is also fed back to the input arbitrators at the other end of the potential links so that credit information can be appropriately updated for each of those arbitrators as well. In one instantiation, only those input arbitrators that sent grant information to the output arbitrator need to receive the "accept" information.

Examples of how the invention could be applied to a credit based scheduling system will now be provided to further explain the basic operations of the Priority Link Selector and the Priority Update Generator.

FIG. 7A sets out, in table form, an example of a list of potential links associated with an input arbitrator. In this example there are eight possible links for the associated input port and the input port can buffer received packets of data for one or more of these eight possible links. In practice there could be fewer or greater than eight links and there could be a queue for each possible link. In one possible arrangement the buffering is effected by virtual queues, one associated with each link.

In the table of FIG. 7A each link has an associated credit value. For example link 4 has the largest credit value, 15, while link 1 has the smallest credit value, 1. The Priority Update Generator can use the credit value for each of the links to create a priority link list such as that shown in the table of FIG. 7B. More specifically, the table shows that the links are ranked from priority 1 to 8 based on the credit value associated with each link. Thus link 4 (credit value 15) has the highest priority, link 1 (credit value 1) has the lowest priority.

The priority link list, created by the Priority Update Generator is passed to the Priority Link Selector, which can operate on the links as follows.

FIG. 8A is a table that presents an example of the request status for the various links associated with this input port. In this example Links 2, 6, and 7 have associated requests, while the remaining links do not. The Priority Link Selector takes the priority list information and uses it to sort the list/request information to yield the sorted list of FIG. 8B. In this sorted list we see that the link with the highest credit, link 4, does not have a pending request. Instead, the highest priority link that has a pending request is link 2. The link list is then de-sorted by the Priority Link Selector and the grant information is associated with Link 2. This grant information then forms one of the "inputs" to the arbitration process for the output port arbitrator.

The grant information is also provided to the Priority Update Generator which uses the results of the selection process to update the credit information in accordance with the credit assignment algorithm. In one embodiment any link having a priority higher than the link "granted" may be penalized, having its credit value reduced by some prescribed amount. Furthermore, a granted link may have its credit value decremented as well. Finally, the credit value for any link that had a request that was not granted might be incremented. In some systems the credit accumulation rate is slower than the credit reduction rate, such that the credit value will only increase if the request has been pending ungranted for a prescribed number of assignment time slots. Alternatively links might receive credit increments even if there is no request pending, where the increment rate is again based in the number of assignment time slots elapsed. Examples of credit accumulation and reduction schemes are described in application Ser. No. 10/952,099 and published Applications 20030072326 and 2003035427.

This same approach is equally applicable to an arbitrator for an output port but in those circumstances the Priority Link Selector receives "grant" information which is the equivalent of the request information for the input ports.

FIGS. 9A to 9C illustrate tables useful for describing an example of how the Priority Update Generator can update the credit values for the priority link list.

FIG. 9A is a table that show the priority link list with credit values associated with each link. The table also has notations to reflect that link 4 should be penalized (p) for the reason that it has no request pending but had a credit value higher than that of the link that was "accepted" ultimately. The table also shows that link 2 has been accepted (A) and that links 6 and 7 also had pending requests (y).

FIG. 9B illustrates changes in credit values (the values have been decremented by one) for the penalized link and the accepted link (links 4 and 2 respectively). FIG. 9C illustrates a change in credit values for a link that had a pending request, but which was not granted. As indicated above an ungranted or unaccepted request will or may accumulate credits at a rate of less than 1 per assignment time slot. In the example shown in FIG. 9C the request for link 6 has been pending for a sufficiently long time to accumulate another credit while the request for link 7 has not been pending long enough to accumulate another credit. Thus the table shows that the credit value for link 6 has been increased while the credit value for link 7 has not been increased.

In the example shown in FIGS. 9A-9C the adjustment of credit values did not lead to a re-ordering of the priority link list. FIGS. 10A-10D provide a set of tables for describing how the Priority Update Generator can alter credit values and priority list order in an efficient manner.

In FIG. 10A the eight links have assigned credit values and are listed in priority order. In this example a request for link 6 is granted and ultimately accepted as it is the link with the highest credit value with a pending request. Link 8 will be penalized because it has a higher credit value, but no pending request. Links 7 and 5 also had pending requests, but they were not granted.

FIG. 10B illustrates how the priority link list and associated credit values appear after the penalty (a decrement of the credit value) on link 8 has been assessed. FIG. 10C illustrates the operation associated with incrementing the credit value for link 1 in accordance with the incrementing rate. In this example the priority list is easily reordered by swapping the places of links 5 and 1 in the list, that is link 1 moves from position 8 to position 6 while link 5 moves from position 6 to position 8. The credit value for link 1 is increased by one.

A similar swapping technique can be utilized to address a "decrementing" situation as well, as shown in comparing FIG. 10C with FIG. 10D. In this circumstance, since link 6 has been accepted its credit value is to be decremented. This means that its credit total will be less than that for links 4 and 2. In this swapping operation links 6 and 2 swap positions in the priority list so that link 2 moves from position 4 to position 2 while link 6 moves from position 2 to position 4.

The position swapping operation described (and illustrated in FIGS. 10B to 10D) is a fast, efficient way to update the priority link list. As illustrated the technique takes a group of 2 or more equal credit value links and when one link is incremented swaps that link for the highest ranked link in the group or when one link is decremented, swaps it for the lowest ranked link in the group.

FIGS. 11 and 12 are useful for explaining alternative techniques for maintaining information about the priority list without incorporating absolute credit-value information directly into the priority list update operation.

For example, in FIG. 11 the links are listed in priority order, but a new column appears in the table reflecting the status of an equality flag (EQ. FL.). The equality flag is set (=1) for a given link when the next link in the list has the same, identical credit value. Thus as illustrated in FIG. 11, priority positions 2 and 3 (links 6 and 4) have the equality flags set because positions 2, 3, and 4 are populated by links having the same credit values. (Note that in implementation the equality flag table need not include the actual credits which have been included in FIG. 11 for explanatory purposes.) Similar status is noted for the links of positions 6, 7, and 8 (links 6, 3, and 1 respectively) whereby the equality flags for positions 6 and 7 are set. The equality flag information can then be used in the same way that the credit values themselves were used above to effect a link swap in the priority link list as credit values are updated.

FIG. 12 illustrates an example that uses relative credit values, or credit value differences, as the indicator for establishing priority order. In this example a new column in the table reflects a difference between the credit values for adjoining links along the priority link list (Δ). Thus the highest priority link (link 8) has a difference value of "2" which corresponds to the difference in credit value between that link and the next priority link (link 6). (Note that in implementation the "differences" table need not include the actual credits which have been included in FIG. 12 for explanatory purposes.) Where adjoining links in the priority list have the same credit value the higher one in the list has a Δ value equal to "0". These "difference" values can then be used in the link position swapping operation described above.

The examples of priority list updating described above are equally applicable to input port arbitrators and to output port arbitrators. Typically, the updating operation needs to take into account whether a granted link has in fact been accepted thereby making the operations of the respective arbitrators interdependent.

Figure 1:
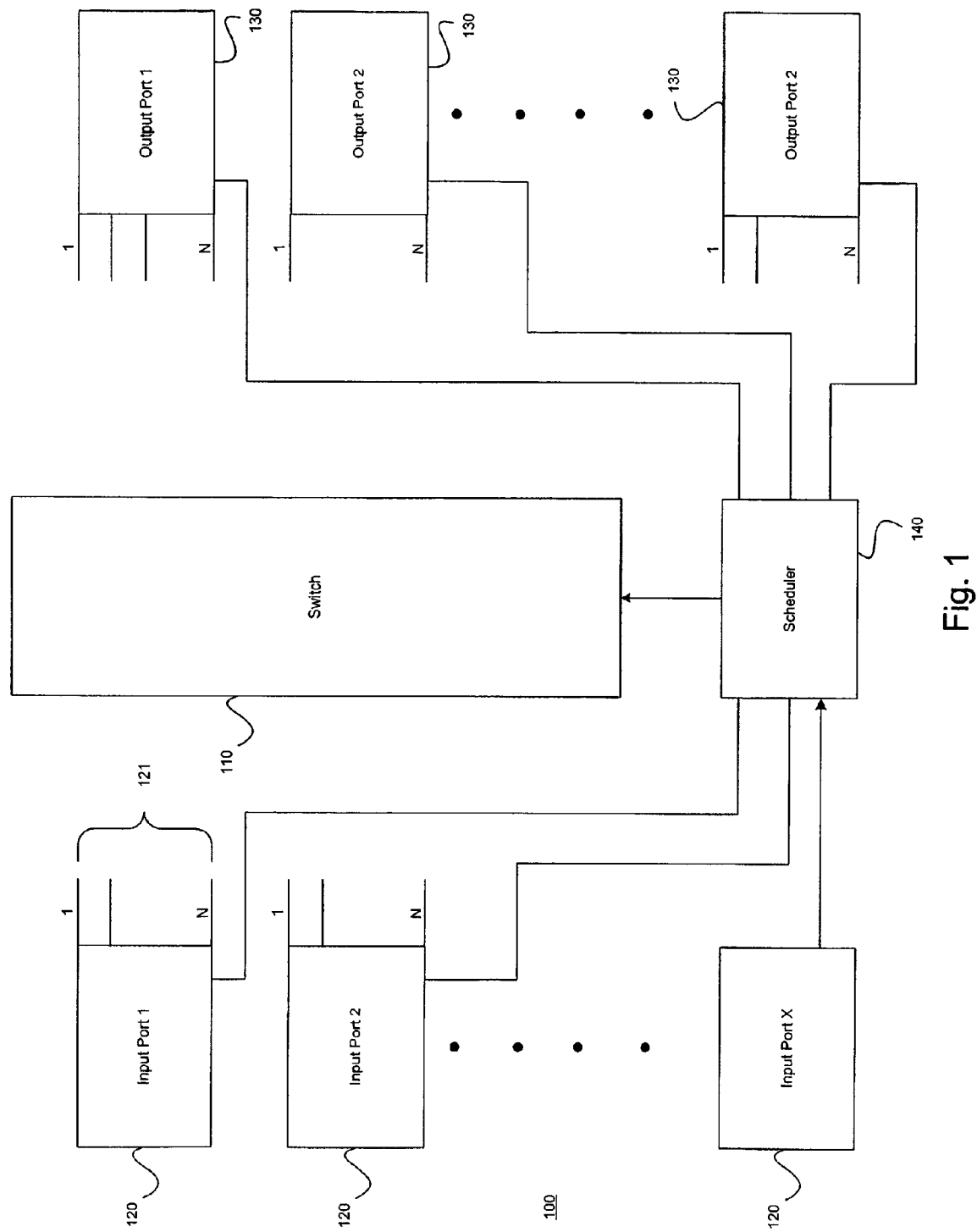
FIG. 1 is a block diagram of a data packet switching arrangement in which an embodiment of the present invention could be employed.
Figure 2:
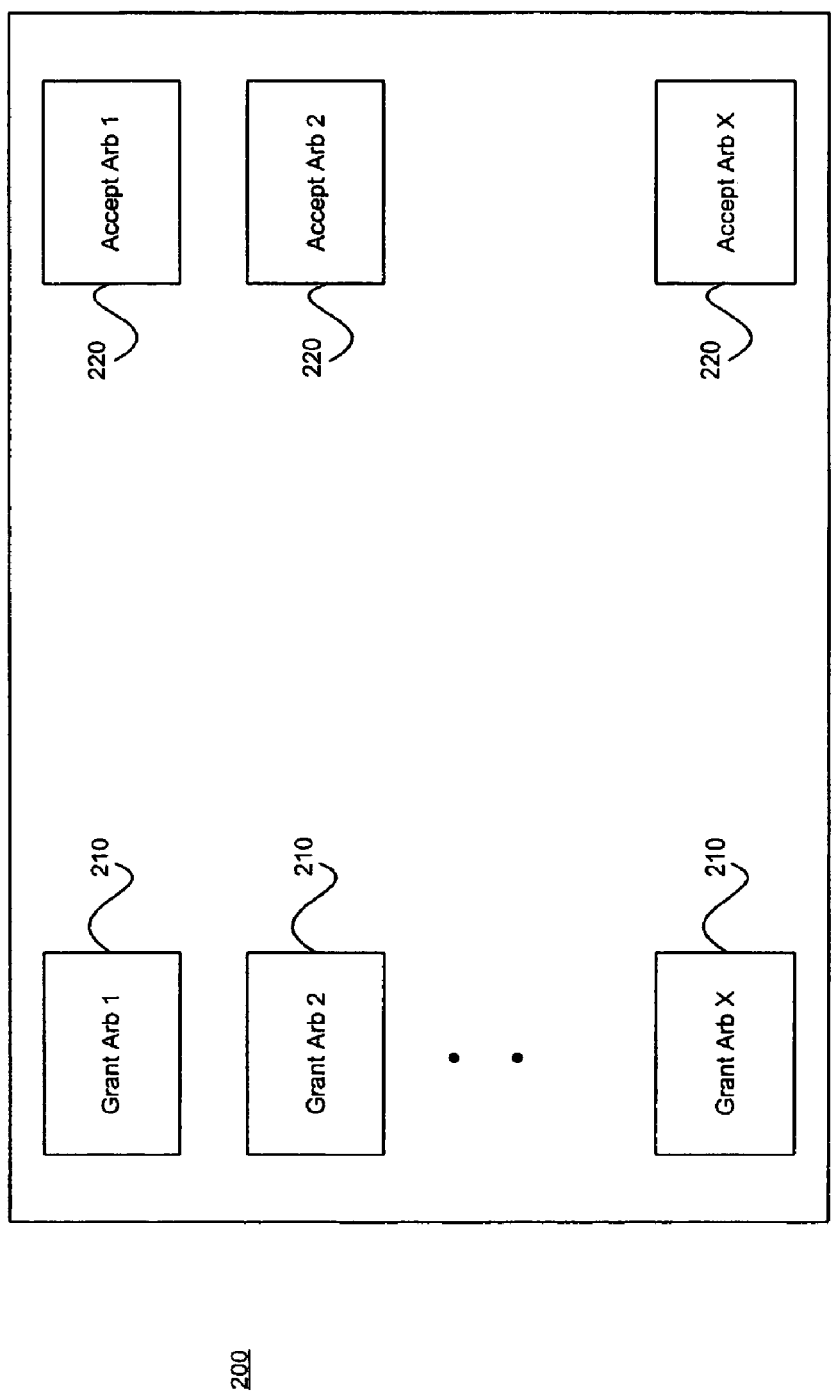
FIG. 2 is a high level block diagram of an arbitrator arrangement that can be used in connection with the arrangement of FIG. 1.
Figure 3:
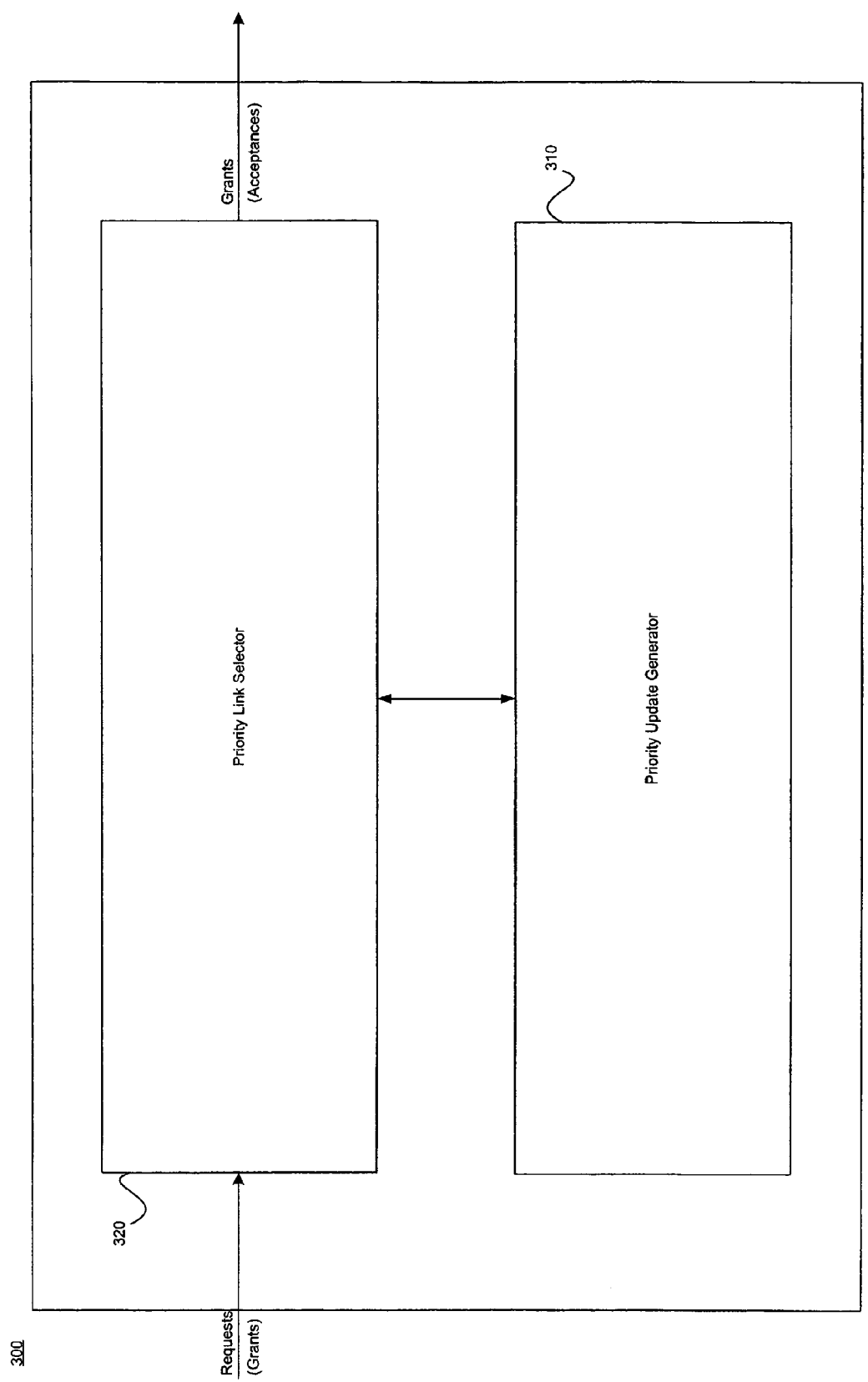
FIG. 3 is a block diagram of a scheduler in accordance with an embodiment of the present invention.
Figure 4:
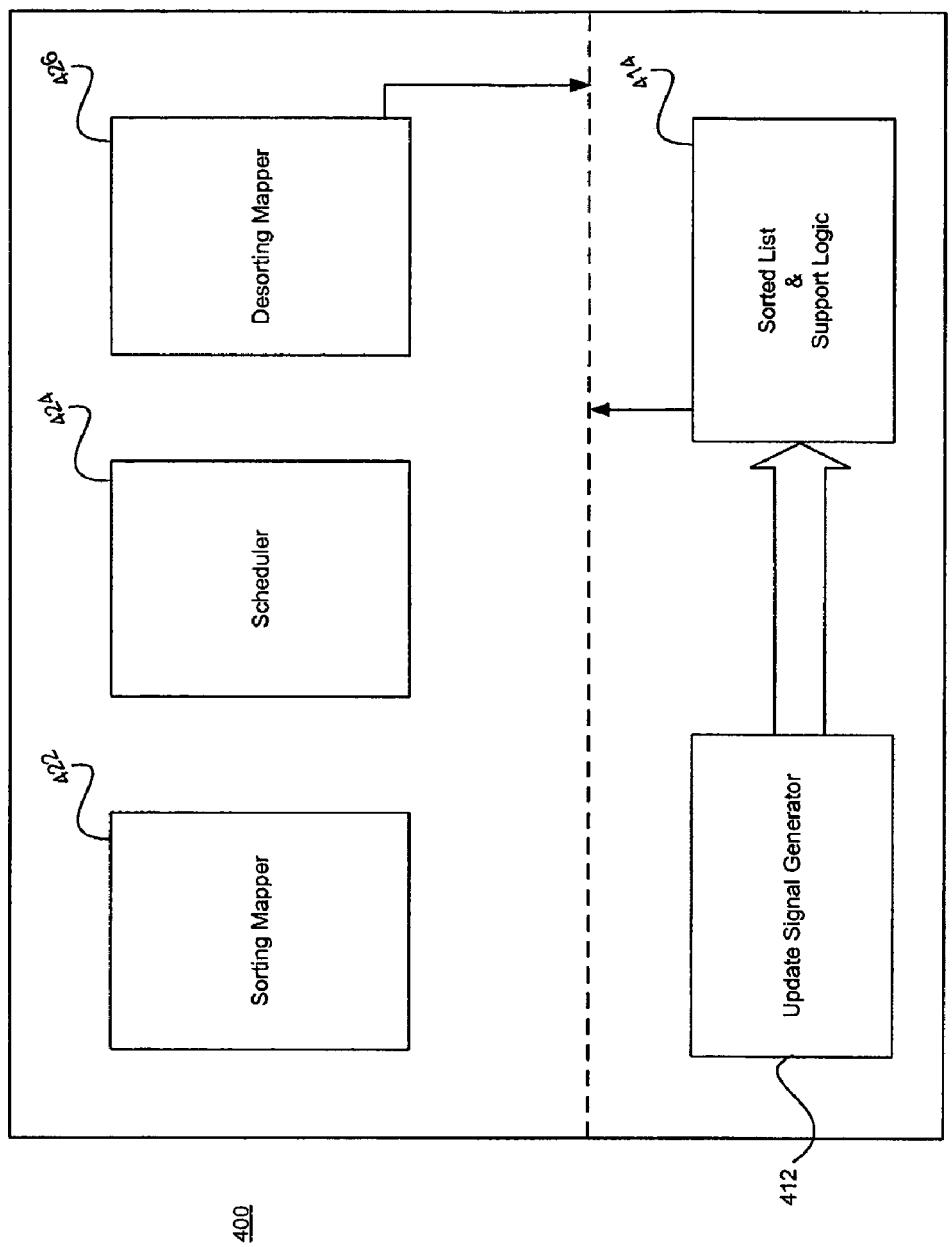
FIG. 4 is a block diagram of an embodiment of the scheduler of FIG. 3.

FIG. 4 illustrates, in block diagram form, an embodiment for the combination of the Priority Link Selector and Priority Update Generator of FIG. 3. In this embodiment the Priority Link Selector 320 includes three modules, a sorting mapper 422, a scheduler 424 and a desorting mapper 426. The Priority Update Generator 310 includes an Update Signal Generator 412 and sorted list end support logic 414.

In operation the sorting mapper receives the link/request information and the priority link list information and sorts the link/request information in accordance with the assigned priorities. The scheduler then selects the requested link having the highest credit value. The sorted "grant" list is passed on to the deserting mapper whereby the link/request information is returned to its original order, supplemented by "grant" information.

The scheduling/grant information is passed to the credit update signal generator which then carries out credit increments and/or decrements. This credit update information is then used by the logic to re-sort the priority link list as appropriate. The logic supplies the priority link list to the mappers in the Priority Link Selector.

Figure 13:
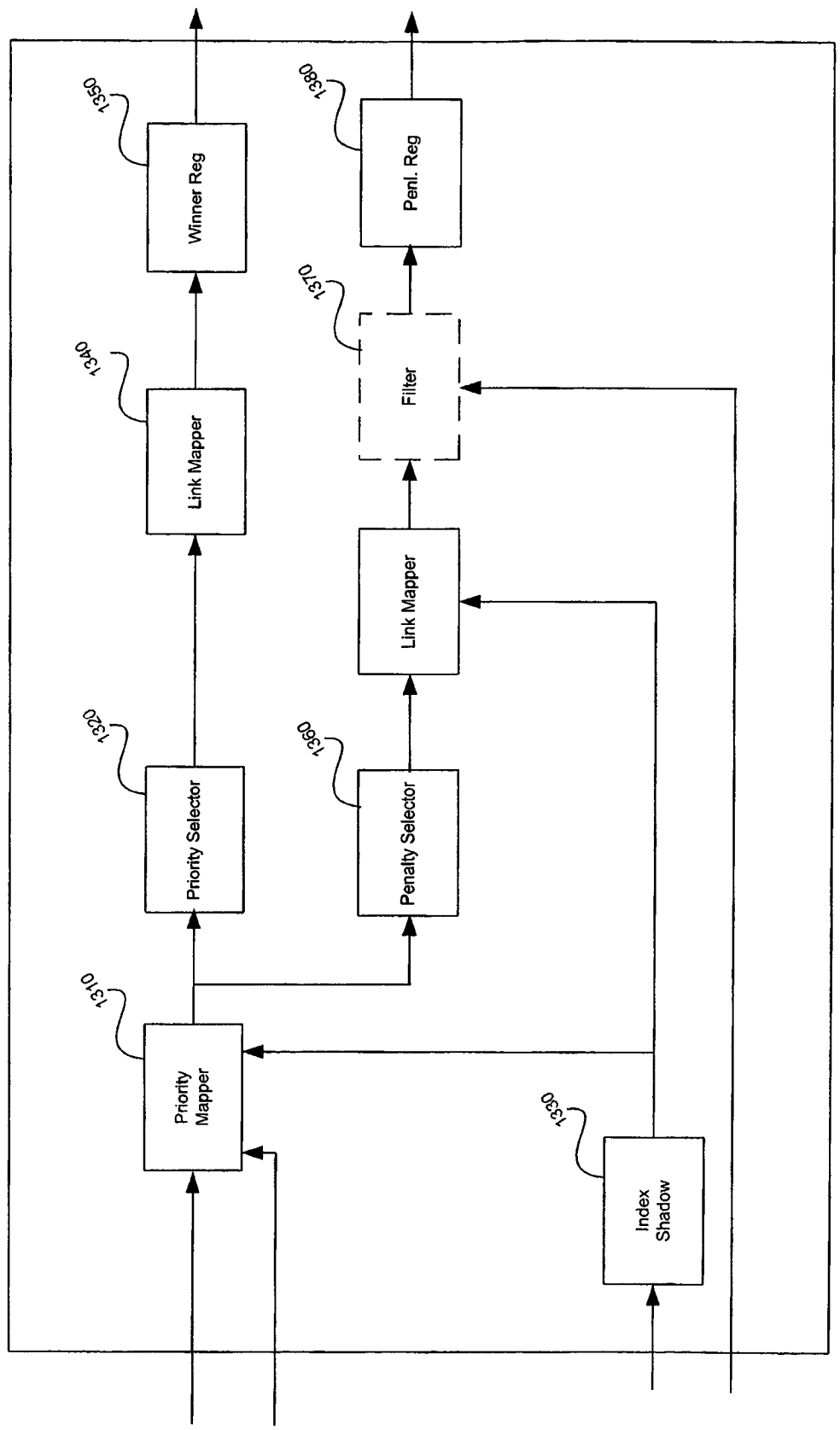
FIG. 13 is a schematic diagram to illustrate a selection process in accordance with an embodiment of the present invention.
Figure 14:
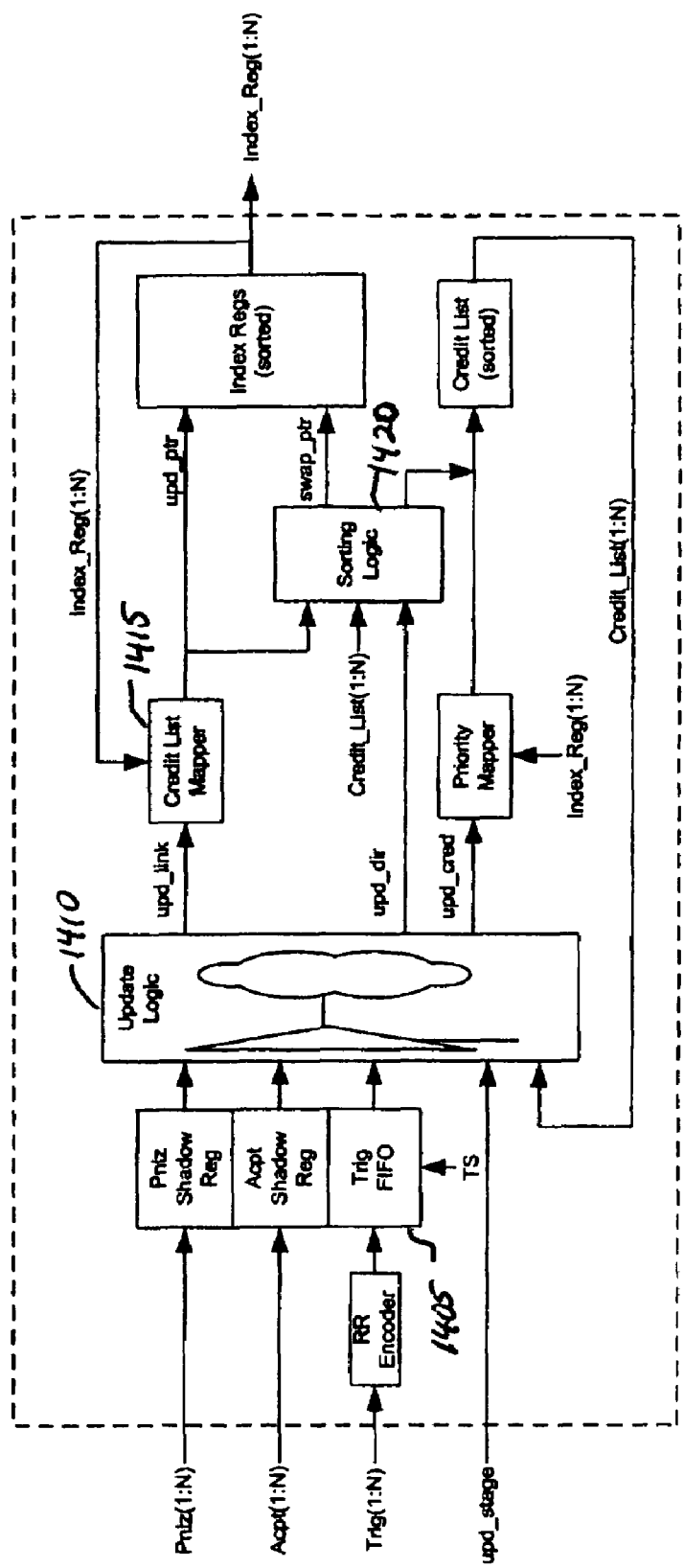
FIGS. 14 and 15 are schematic diagrams illustrating an updating process in accordance with an embodiment of the present invention.

FIGS. 13 and 14 provide further illustrative embodiments of the arrangements for priority selection and priority updating.

FIG. 13 provides a block diagram of an arrangement for the priority selector. All input candidates are coming in parallel in a fixed order of their link numbers. The Priority Mapper 1310 first selects the input candidates for the current matching process. This step is necessary to eliminate candidates that have won in the previous match in the same time slot. Using the rank list that contains the link numbers in priority order captured at the beginning of a time slot, Index_Reg(1:N), received by the Index Shadow 1330 selected candidates are mapped out in a prioritized order. The Priority Selector 1320 picks out the active candidate with a highest credit in the prioritized vector and presenting them as Pr_Winners(1:N). The Penalization Selector 1360 selects all non-active candidates that have higher credits than the winner and presenting them as Pr_Pnlz(1:N). The Link Mapper 1340 then inverse maps all prioritized vectors back to the order that they came in again using the ranked link list from the previous time slot, Index_Reg(1:N). The Pr_Winners(1:N) vector are sent out as either Grant or Accept signals, Winners (1:N) via Winner register (Winner Reg. 1350). The Penalization Filter 1370 is required for the Accept Arbiter, since penalizations are only applied to the non-request links. The Pnlz(1:N) vector is captured at the end of first iteration via penalty register (Penl. Reg. 1380) for the credit updating in the next time slot.

FIG. 14 provides a block diagram of an arrangement for the update generator. This block is responsible for updating the credit list and maintaining the order of the ranked link list (Index Regs). Examples of the functional requirements for this block include 1. A rate trigger (Rate trig) is encoded and queued in a trigger buffer (Trig FIFO 1405) in a round robin fashion on every clock cycle, this rate trigger updates one link per time slot;
2. Credit list vector values are the differential credit between the current and adjacent less credit link. Pointers to this vector are ranked according to their credit values. For example, for a ranked credit vector C in order from highest to lowest credit, the differential vector D's element has values of: $D_n = C_n - C_{n+1}$; where n is from 1 to N in order from highest to lowest credit which is similar to the technique described in relation to FIG. 12.
3. An Index Register to the credit vector list contains the link numbers. Like the credit list vector, its pointers are also ranked in order from highest to lowest credit.
4. Credit updating is carried out in three stages in a single time slot: (1) parallel update all accepts and penalizations for links that require no resort of the list, (2) rate increment update the link at the head of the Trig FIFO and resort the list, (3) update one accept or penalization that lead to a resort and then resort the list.

5. Re-sorting is accomplished by swapping only the ranked link list, Index Registers as described in connection with FIGS. 10C and 10D.

On every time slot the Triggering Module generates a rate trigger vector, Trig(1:N), this vector is encoded in round robin fashion and queued up in a Trig FIFO 1405 at the system clock rate. At the beginning of every time slot, the FIFO is de-queued, the encoded link number is presented to the Update Logic 1410. At the same time, the accepts and penalization signals, Acpt(1:N) and Pnlz(1:N), are also captured and presented to the Update Logic 1410. The Update Logic will perform the credit updating in three consecutive stages in order as shown below:

1. First stage:
   If there are any pending accepts or penalizations and their differential credits are non zero, then decrementing their differential credits all at the same time. Reset the appropriate pending accepts or penalizations for third stage.
2. Second stage:
   If there is any pending rate trigger then output the encoded link number (upd_link) and increment update (upd_dir) signals. Else go to third stage.
3. Third stage:
   If there is any pending accept then output the encoded link number (upd_link) and decrement update (upd_dir) signals. Else if there is any pending penalization then output the upd_link and upd_dir signals. Reset the appropriate pending accepts or penalizations for next third stage iteration if any.

Figure 15:
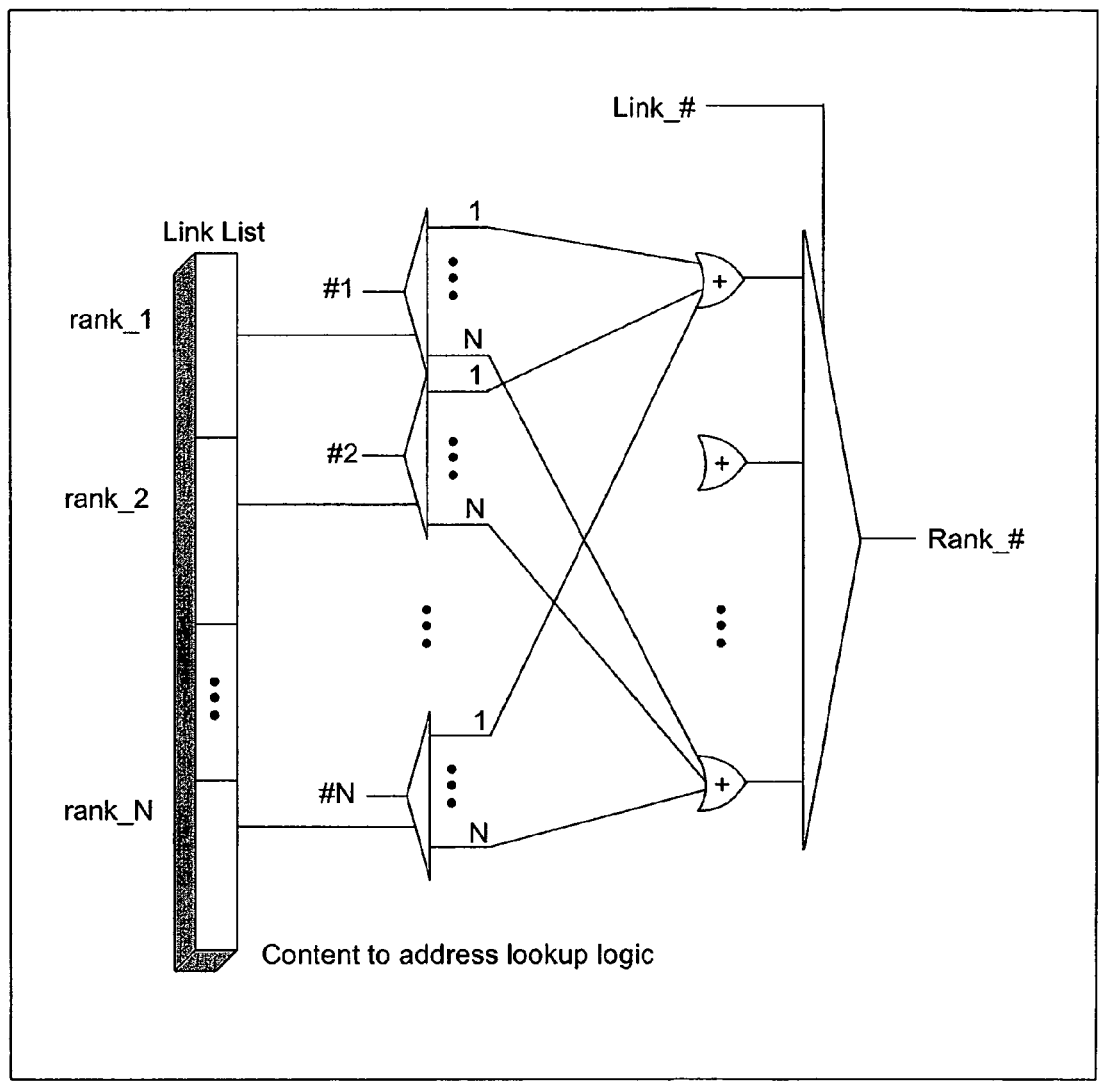

The Credit List Mapper 1415 and the Sorting Logic functions 1420 are used only for second or third stage that required a re-sort of the credit list. The Credit List Mapper 1415 maps the encoded link number (upd_link) into a credit list pointer (upd_ptr) using the contents of the Index Register 1425. The basic design of the Credit List Mapper logic is illustrated in FIG. 15. The Index Register is a ranked link list that contains the link numbers in ranked order, which is referred to as the Link List in FIG. 15.

The Sorting Logic 1420 uses the upd_ptr and upd_dir signals to determine the pointer to the to-be-swap link (swap_ptr) in the Index Register and to determine which credit list's element is to-be-update. Using the relationship between the elements of the credit list, the swap pointers can be pre-determined using combinatorial logic. Look-ahead logic shall be implemented to minimize propagation delay. The total path delay will be optimized to be within one clock cycle.

The logic is described as follows. In a differential credit list, every element has a deterministic relationship with its adjacent elements. Using this relationship, one can readily determine how to resort the list when only one element is updated in value. When an element's value is incremented, this element will be moved up on the list unless it's already at the top. If an element's value is decremented, this element will be moved down the list unless it's already at the bottom. Now, all that must be known is which element in the list that to swap with. The logic that determines the swap pointer is as such:

1. Moving up?
   If already at the top then stay, else if the element above is zero (same credit) then swap the element above, else stay. This logic is propagated up the list, all the swap positions are then determined.

2. Moving down?
   If already at the bottom then stay, else if the current element is zero (below element has the same credit) then swap with the element below, else stay. This logic is propagated down the list, all the swap positions are then determined.

With the known swap pointer, the credit list then will be updated appropriately. An example of pseudo codes for updating the credit list based on swap_ptr is shown below:

```
{
    If(upd_dir = 'increment')
        swap_ptr = up[upd-ptr]
        If(swap_ptr = 1)                               // if at the top
            (Diff[swap_ptr] + 1)
        Else (Diff[swap_ptr-1] – 1) and (Diff[swap_ptr] of 1)
    Else If(upd_dir = 'decrement')
        swap_ptr = down[upd_ptr]
        If(swap_ptr = 1)                               // if at the top
            (Diff[swap_ptr] – 1).
        Else (Diff[swap_ptr] – 1) and (Diff[swap_ptr – 1] + 1)
}
```

With the two provided pointers upd_ptr and swap_ptr, the Index Register swaps the contents of those two registers in one clock cycle. This concludes the resort process of the credit list.

Thus, the present invention provides a mechanism and method for efficiently scheduling link assignments in a switching fabric and is particularly useful in a credit-based scheduling environment. In the arrangement, the functional operations are grouped to enhance efficiency, that is by separating the selection process from the update process. In addition the updating operations take advantage of the nature of credit based systems to perform complex re-prioritization operations in a more efficient manner.

Those skilled in the art will appreciate that given the data communication environment in which this invention is employed, the algorithms and schemes described herein are performed using such processing devices as programmable logic, processor or microprocessor arrangements supported by program(s) stored in memory or other computer processor-type arrangements which can support such functionality.

The above description provides examples of how the invention might be deployed with a particular credit-based assignment scheme and in a particular switch fabric architecture. However, other credit-based algorithms or link priority assignment algorithms might be employed using the inventive concepts disclosed herein. In addition, the invention can be deployed in various architectures where a link arbitration process is to be performed to select one or more paths from a plurality of paths.

What is claimed is:

1. In a process for arbitrating a selection of one of a plurality of links using a priority list based on weight information associated with the plurality of links, a method for updating weight information associated with said plurality of links, the method comprising:
   adjusting over a first time period a weight information for a selected link to reflect an acceptance of a request for that link;
   adjusting over a second time period weight information for one to-be-penalized link so as to reflect a penalty being assessed to said to-be-penalized link, the to-be-penalized link having a highest weight from all the links in the plurality of links, wherein links different from the to-be-penalized link with higher weight than the selected link are not penalized; and adjusting over a third time period weight information for a second link from the plurality of links so as to reflect a weight increase associated with said second link, the second link having requested selection contemporaneously with the selected link;

wherein said third time period is different from both said second and said first time periods.

2. The method of claim 1 wherein said first time period differs from said second time period.

3. The method of claim 1 further comprising:
updating said priority list to reflect each of the weight adjustments.

4. The method of claim 1 wherein when the weight adjustment reflecting a penalty would require a change in order of the priority list, then said second time period is made to follow said third time period.

5. The method of claim 4 wherein when the weight adjustment reflecting an acceptance would require a change in order of the priority list, then said first time period is made to follow said third time period.

6. The method of claim 1 wherein when the weight adjustment reflecting an acceptance would require a change in order of the priority list, then said first time period is made to follow said third time period.

7. In a process for updating credit values associated with a plurality of flows through a switching fabric, a method for increasing credit for a plurality of flows, the method comprising:

queuing a plurality of link indicators associated with requests for processing in the switching fabric;

at each clock cycle dequeuing one of said plurality of link indicators which was not granted processing; and generating, with a clock cycle, a trigger to increase a credit value associated with the link indicator dequeued in that clock cycle;

wherein credit values associated with link indicators other than the dequeued link indicator which requested processing remain unchanged.

8. The method of claim 7 wherein only one link indicator has a credit value trigger in a given clock cycle.

9. In a system for arbitrating a selection of a link from a plurality of links, a method for maintaining a link priority list, the method comprising;

assigning each link a credit value;

ranking the links in accordance with assigned credit values;

assigning a flag to each ranked link based on the credit value of the link and the credit value of an immediate adjacent link;

receiving credit-value-update information for one of the links;

examining the flag for the link for which credit-value-update information is received; and adjusting a rank position of the link for which credit value information has been received, the adjusting occurring with reference to the flag for that link and to the flags of adjacent links in the ranked links.

10. The method of claim 9 wherein:
said flag for a link represents whether that link has the same credit value as the next link in order of priority.

11. The method of claim 10 wherein at least three of the ranked links have the same credit value and when one of said at least three has a credit value adjustment reflecting a lowering of priority then that one of said at least three swaps rank position with the lowest ranked one of the at least three having the same credit value.

12. The method of claim 10 wherein at least three of the ranked links have the same credit value and when one of said at least three links has a credit value adjustment reflecting an increasing priority then that one of said at least three swaps rank position with the highest ranked one of the at least three having the same credit value.

13. The method of claim 12 wherein the swap comprises changing pointers of the links subject to the swap.

14. In a system for arbitrating a selection of a link from a plurality of links, a method for maintaining a link priority list, the method comprising:

assigning each link a credit value;

ranking the links in accordance with assigned credit values;

maintaining difference information for each link, said difference information for a given link indicating a difference in credit value between the given link and a link immediately adjacent to the given link in the ranking of the links;

receiving credit-value-update information for one of said links; and adjusting a position in the ranking for said one of said links with reference to said credit value-update information and said difference information associated with said one of said links.

* * * * *